(12) United States Patent
Hasler et al.

(10) Patent No.: US 7,417,769 B2
(45) Date of Patent: Aug. 26, 2008

(54) COLOR MANAGEMENT SYSTEM USING DISTRIBUTED PROFILES FOR COLOR PRINTING SYSTEMS

(75) Inventors: David Hasler, Münster (DE); Roland Campa, Nordwalde (DE); Martin Beyer, Bergkamen (DE); Francis Lamy, Zollikon (CH); Peter Ehbets, Zürich (CH); Bruno Zimmermann, Zürich (CH)

(73) Assignee: X-Rite Europe AG, Regensdorf (CH)

( * ) Notice: Subject to any disclaimer, the term of this patent is extended or adjusted under 35 U.S.C. 154(b) by 599 days.

(21) Appl. No.: 10/867,011

(22) Filed: Jun. 15, 2004

(65) Prior Publication Data

US 2005/0094209 A1    May 5, 2005

(30) Foreign Application Priority Data

Jun. 16, 2003 (EP) .................................. 03013650

(51) Int. Cl.
*H04N 1/40* (2006.01)
(52) U.S. Cl. .................... 358/2.1; 358/504; 358/518
(58) Field of Classification Search ............... 358/1.9, 358/2.1, 3.23, 406, 504, 518; 382/162, 167
See application file for complete search history.

(56) References Cited

U.S. PATENT DOCUMENTS 5,612,902 A    3/1997    Stokes 6,671,067 B1 * 12/2003 Adam et al. .................. 358/1.6

FOREIGN PATENT DOCUMENTS

| EP | 0 983 863 A1 | 3/2000 |
| EP | 1 231 776 A1 | 8/2002 |
| JP | 2001358955 A | * 12/2001 |
| JP | 2003060922 A | * 2/2003 |

OTHER PUBLICATIONS

Vrhel M J et al: "The Mathematics Of Color Calibration", Image Processing, 1998. ICIP 98. Proceedings. 1998 International Conference In Chicago, IL, ISA Oct. 4-7, 1998, Los Alamitos, CA, USA, IEEE Compu. Soc., US, Oct. 4, 1998, pp. 181, 185 XP010308733.

* cited by examiner

*Primary Examiner*—Thomas D Lee
(74) *Attorney, Agent, or Firm*—Buchanan Ingersoll & Rooney PC

(57) ABSTRACT

A color management system using distributed profiles includes a color printer adapted to print controlled color using a custom profile. The color printer system creates a custom profile by reading its initial characterization data, the profiles of the inks and the profile of the paper used in the printer. The color printing system includes a spectral measurement module adapted to generate spectral measurement of an output of the color printer. The printing system computes its initial characterization data by using the output of the color printer, measured by the spectral measurement module. The printing system updates the paper profile, the ink profile and/or the printer characterization data based on the measurement of the spectral measurement module.

9 Claims, 17 Drawing Sheets

Figure 8: estimation overview

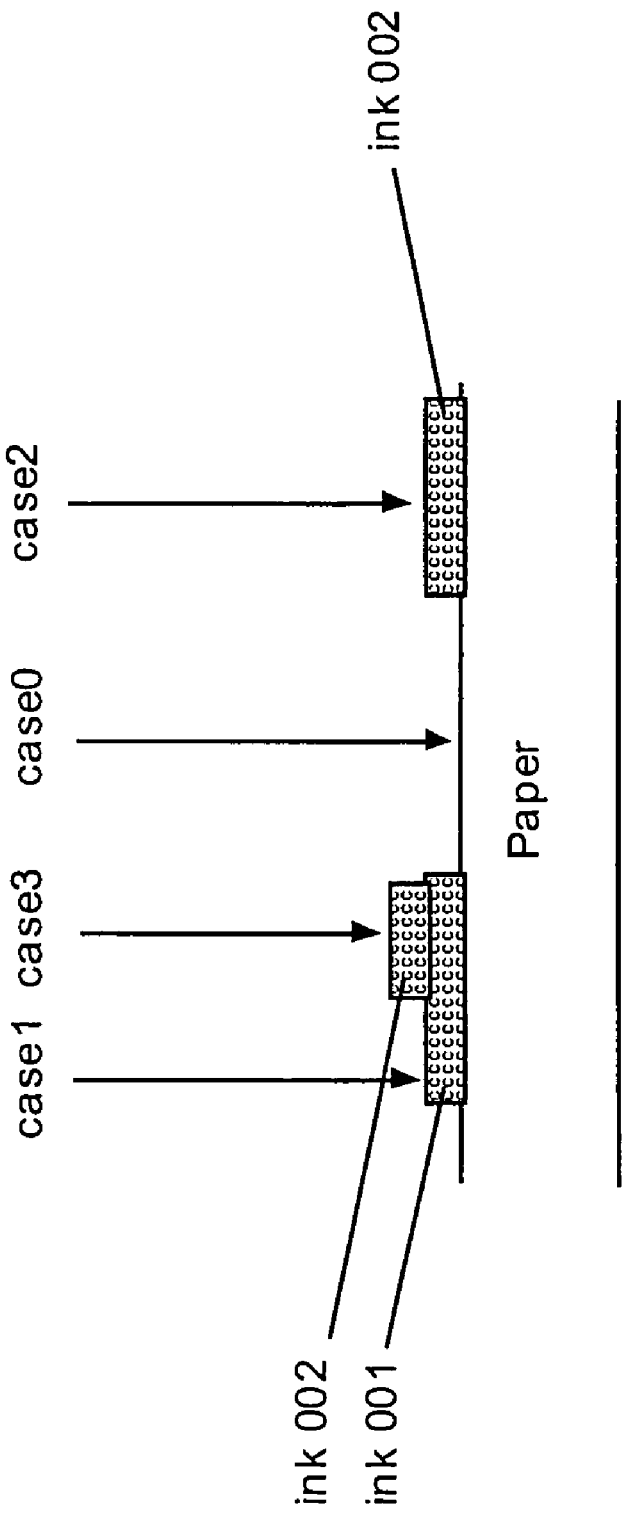
Figure 16: Example of a 2 inks printer. Enumarating all possible configurations.

COLOR MANAGEMENT SYSTEM USING DISTRIBUTED PROFILES FOR COLOR PRINTING SYSTEMS

CROSS REFERENCE TO RELATED APPLICATIONS

This application claims priority under 35 U.S.C. §119 to European Application 03 013 650.1 filed in Europe on 16 Jun. 2003, the entire contents of which are hereby incorporated by reference in their entirety.

BACKGROUND

This present invention relates generally to a color printing system, and more specifically to a system that allows for automatically managing of colors in a printing system with the ability to choose the amount of user intervention in the process.

When printing with a color printing system, variations in color images produced by the system are very common. Such variations can occur, for example, when printing the same image at different times, when printing with different inks or when printing on different papers. To overcome these difficulties, color management techniques offer the possibility to print a target containing several hundreds patches, to measure these patches with a dedicated instrument, in order to characterize the printer system. The printing system includes a printer, an ink set and a specific paper. If one of the printer, ink of paper changes, the characterization has to be repeated. This characterization process is time consuming and generates costs in material as well as in resource allocation. Time consumption, or more generally resource allocation, is currently one of the most critical aspects for color management in printing facilities.

Color management is based on the use of International Color Consortium (ICC) profiles, which relate the color outputted by a device to the color expressed in a device independent space. This device independent space can be either CIELAB or XYZ color space. This workflow is summarized in FIG. 0.

The data is acquired by an input device 1000, whose ICC profile 1010 is known. The ICC profile is used by a color management module 1111 (CMM) to convert the input data 1100 into the CIELAB (or XYZ) color space, resulting in the device independent data 1101. To print this data, the CMM 1111 uses the ICC profile 1011 of the output device 1001, and transforms the device independent data 1101 into an output device specific data 1102. The output device specific data 1102 is sent to the output device 1001, resulting in a print 1002 with the desired colors.

In order to successfully apply color management one needs an input ICC profile, an output ICC profile associated with output device as well as a CMM.

SUMMARY

A system is disclosed that allows managing colors in an efficient way, minimizing the user intervention time and resource allocations.

Exemplary embodiments include an ability to integrate characterization data from several sources and merge them together to build a color characterization ICC profile.

A characterization of the printing process is performed by printing an adequate target on the printer only once, with a paper and ink set in accordance with the user needs. This characterization can be done by the printer manufacturer or by the user, but has to be done at least once for each individual printer. In this characterization process, the system is able to characterize each component of the printing process: the inks, the paper, and the printer. Then, if a change occurs, the system is able to perform color management with the characteristics of the added elements and the characteristics of the removed element, without the need of a new print. For example, if the cyan ink is replaced by a blue one, the system only needs the characteristics of the blue ink to be able to manage the colors of the whole system; the characteristics of the cyan ink being known through the initial characterization process.

If a change of paper is performed in the system, the paper characteristics may be given by the paper manufacturer, or can be measured with a spectrophotometer outside the printing line. If a change of ink is performed in the system, the ink characteristics may be given by the ink manufacturer, or can be measured on a sample of the ink that has been printed on a well known, or measurable paper. This print is performed in general by the ink manufacturer. It may also be done by the user, but outside the printing line. In this way, the printing line has never to be stopped to perform a color profile. In addition to this, measuring a paper or an ink characteristics requires less than 10 measurement actions, and is much more time efficient than a standard color characterization process.

Additionally, the system is able to enhance the precision of the color management if a print of the new system configuration is available. This improvement distinguishes itself from the currently available techniques in the number of color patches needed. The present invention is able to enhance the color management even if only one patch is printed on the printer. In general, the more patches are printed, the better the color management. But instead of using several hundreds patches, this technique requires from one to about hundred patches to work.

The current technique is also able to integrate some information coming from a printer of the same family. This information comes in general from the printer manufacturer.

BRIEF DESCRIPTION OF THE DRAWINGS

The invention is described below in more detail in connection with the drawings. In the drawings:

FIGS. 7-16 show details of workflow and data elements of an exemplary embodiment of the inventive system as outlined in FIGS. 1-6.

DETAILED DESCRIPTION

A system and method are disclosed for improving the efficiency of a color management workflow. Exemplary embodiments allow performing color management with much less resource allocations than the current techniques. Currently available physical models of ink and paper can also be improved.

Figure 0:
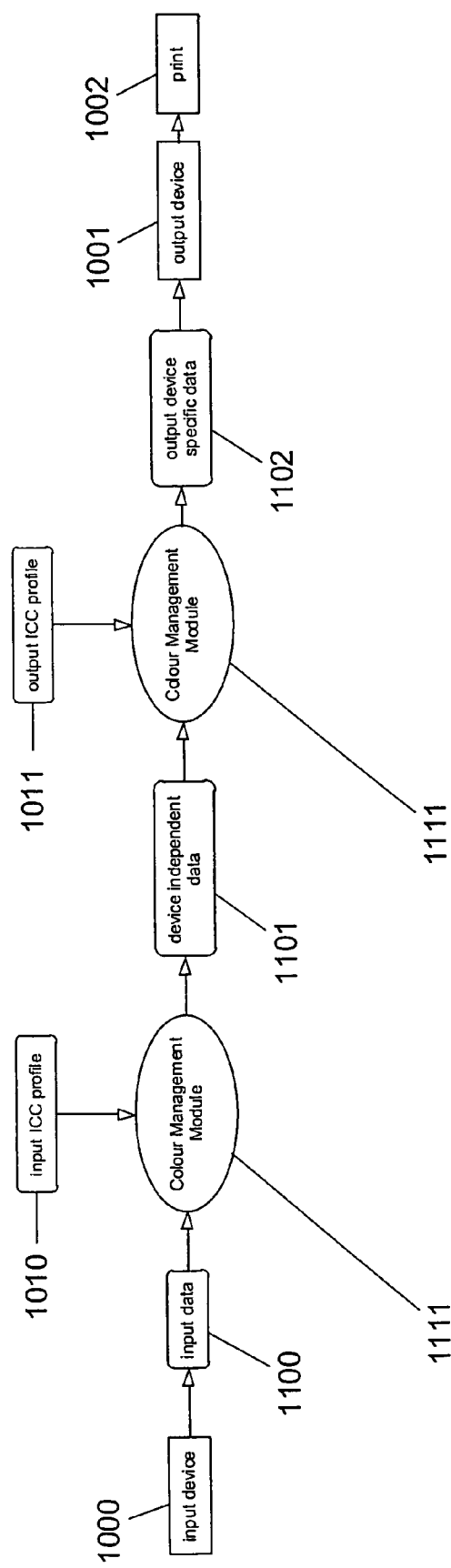
FIG. 0 shows a flow diagram of the workflow for creating International Color Consortium (ICC) profiles.
Figure 1:
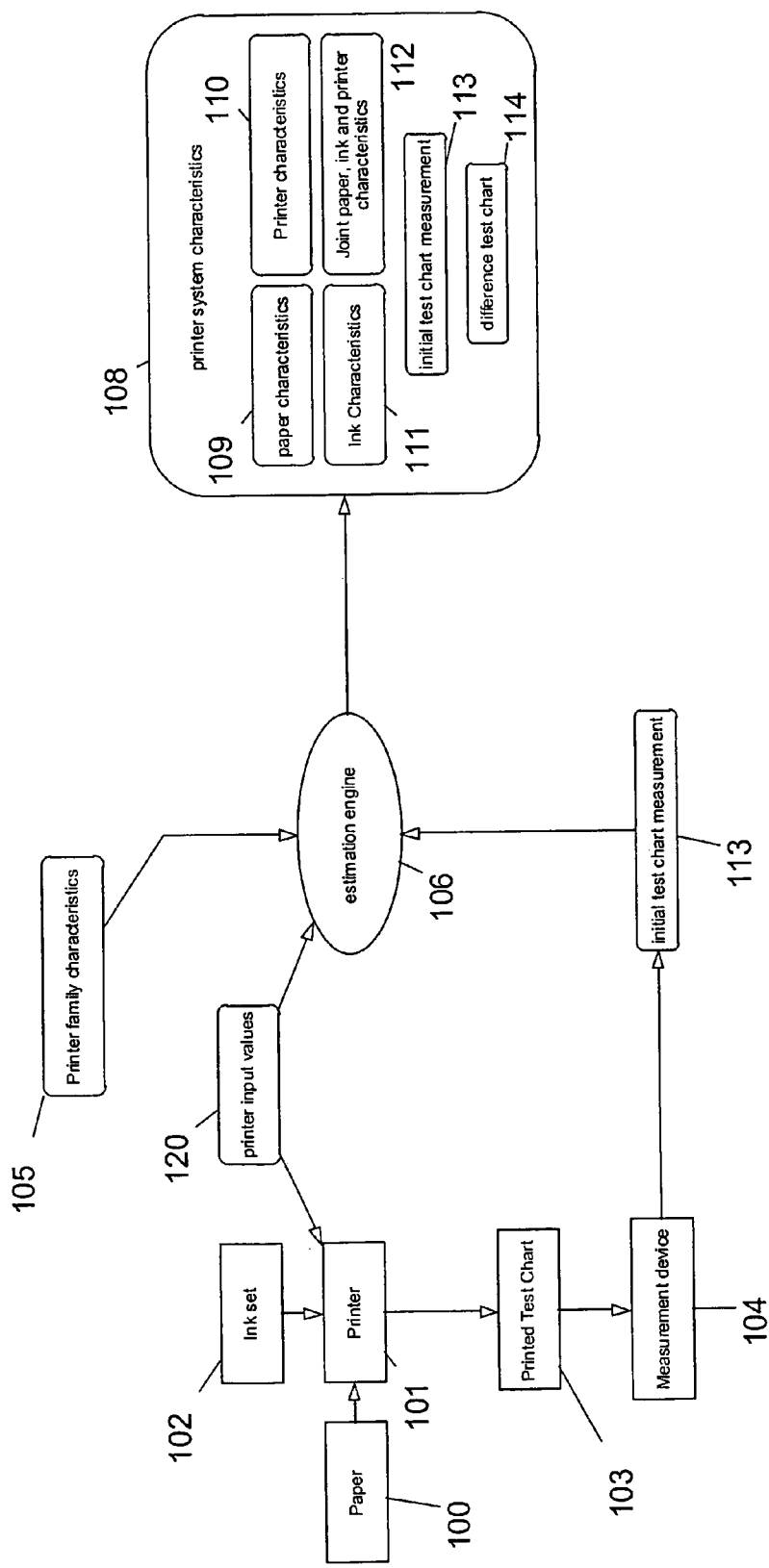
FIG. 1 shows a flow diagram of a first step of the color management workflow according to an exemplary embodiment of the invention.

A new color management workflow is disclosed that is performed in two steps. The first step is described in FIG. 1 and includes characterizing a printer system. The second step includes integrating a new element, and computing an ICC profile without the need of a print.

In the first step, the user chooses the ink set 102, the printer 101 and the paper 100. A test chart 103 composed of several color patches is printed, according to the printer input values 120, and measured with a device 104 that extracts spectral information 113 from the print 103. By spectral information, we refer to a vector of at least three components that are associated to a part of the spectrum in continuous space. The measured test chart 113 is given as input to the estimation engine 106 that computes the printer system characteristics 108. The estimation engine 106 also uses some a-priori knowledge coming from the printer family characteristics 105.

The printer system characteristics 108 contains a set of one or more files for each of the paper characteristics 109, the ink characteristics 111, the printer characteristics 110, the joint paper, ink and printer characteristics 112, the measured initial test chart 113, and the difference test chart 114 (representing a difference file, or fitting file, which can be used to adjust spectral files).

Figure 2:
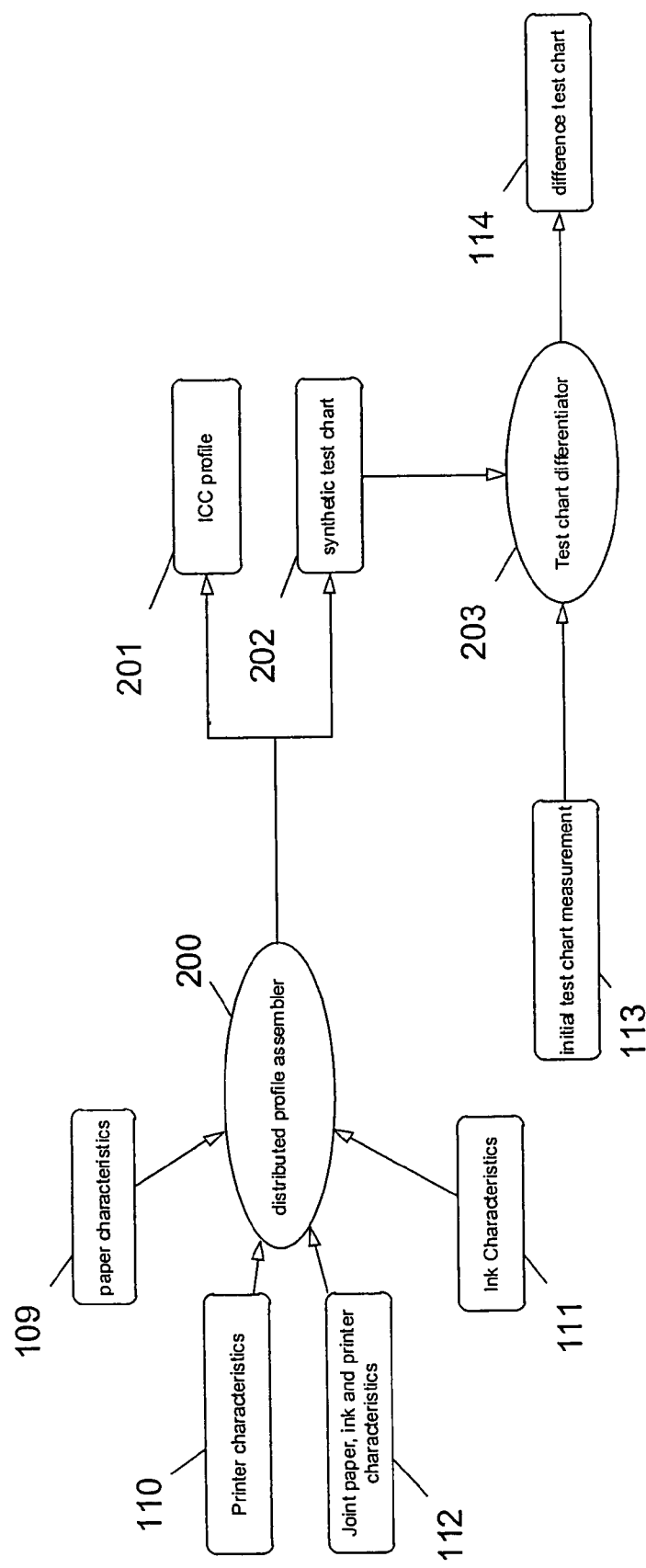
FIG. 2 shows a flow diagram of a second step of the color management workflow according to an exemplary embodiment of the invention.

The difference test chart 114 can be computed according to the method described in FIG. 2.

The distributed profile assembler 200 combines the characteristics of the various elements of the printer system 108 (the paper characteristics 109, the printer characteristics 110, the ink characteristics 111 and the joint paper, ink and printer characteristics 112) to build the International Color Consortium (ICC) profile 201. It also re-computes the color patches of the test chart 103 resulting in the synthetic test chart 202. The synthetic test chart 202 is compared to the initial test chart measurement 113 with the test chart differentiator 203 resulting in the difference test chart 114. The test chart differentiator computes the spectral difference between each of the corresponding patches in 113 and 202.

Figure 3:
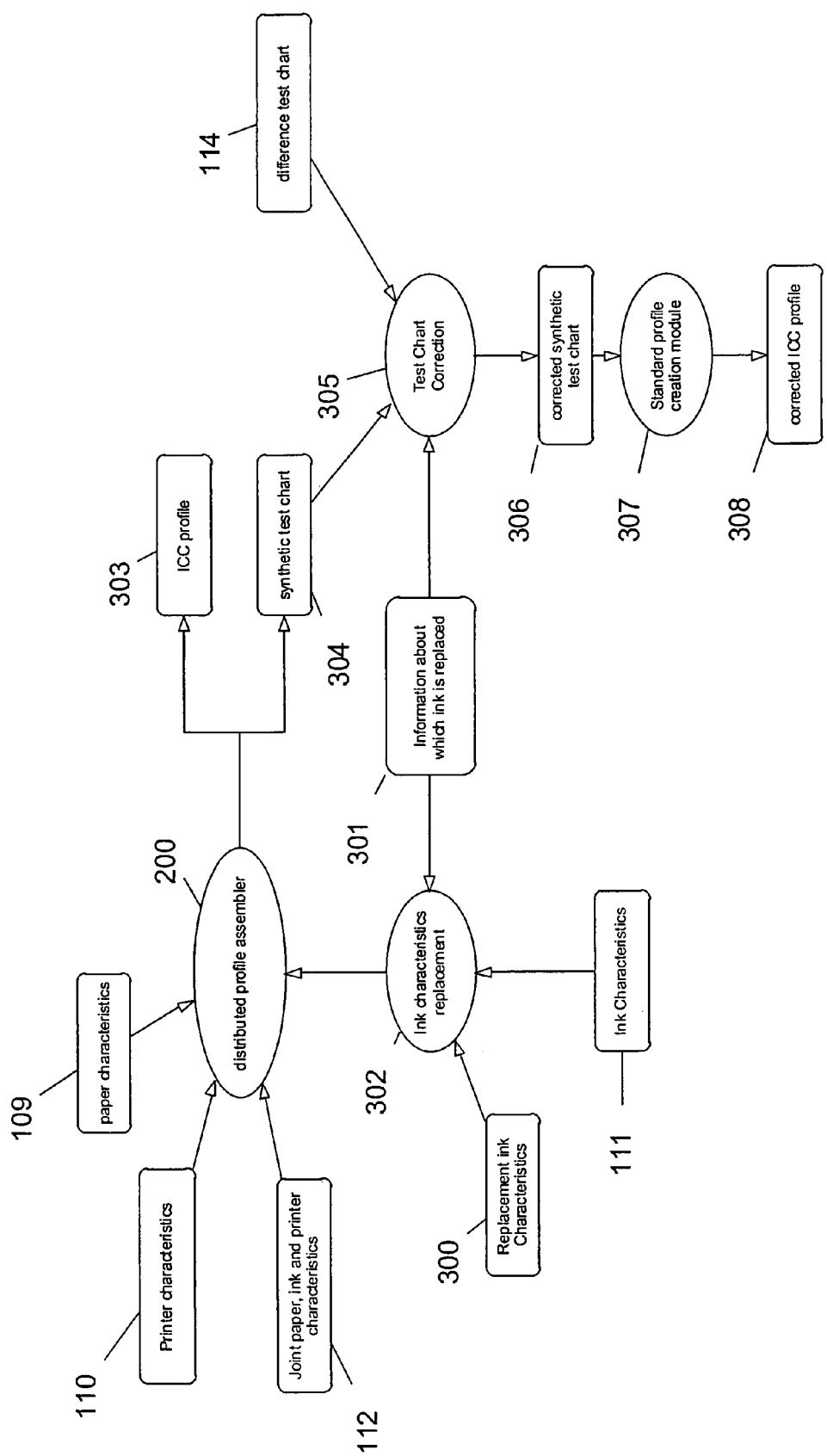
FIG. 3 shows how an exemplary inventive system computes an ICC profile when an ink is replaced in the printer.

FIG. 3 describes how the system can compute an ICC profile when an ink (or several inks) is replaced in the printer. The ink characteristics replacement module 302 modifies the ink characteristics 111, by replacing the characteristics of the removed ink with the characteristics of the new ink 300. The user has to tell the system which ink gets replaced (information 301). The output of module 302 embodies the new ink characteristics, that combined with the paper characteristics 109, the printer characteristics 110 the joint paper, ink and printer characteristics 112 in the distributed profile assembler 200 result in an ICC profile 303 and a synthetic test chart 304. The system assumes that the joint paper ink and printer characteristics 112 have not changed. The synthetic test chart 304 can be corrected by the test chart correction module 305 with the difference test chart 114: the patches of synthetic test chart 304 that are equal to the patches of the synthetic test chart 202 get corrected by addition of the corresponding patch in the difference test chart 114. The test chart correction module 305 outputs a corrected synthetic test chart 306. A standard profile creation module 307 uses the corrected synthetic test chart 306 to create a corrected ICC profile 308.

The user can choose either to use the profile 303 or the profile 308.

Figure 4:
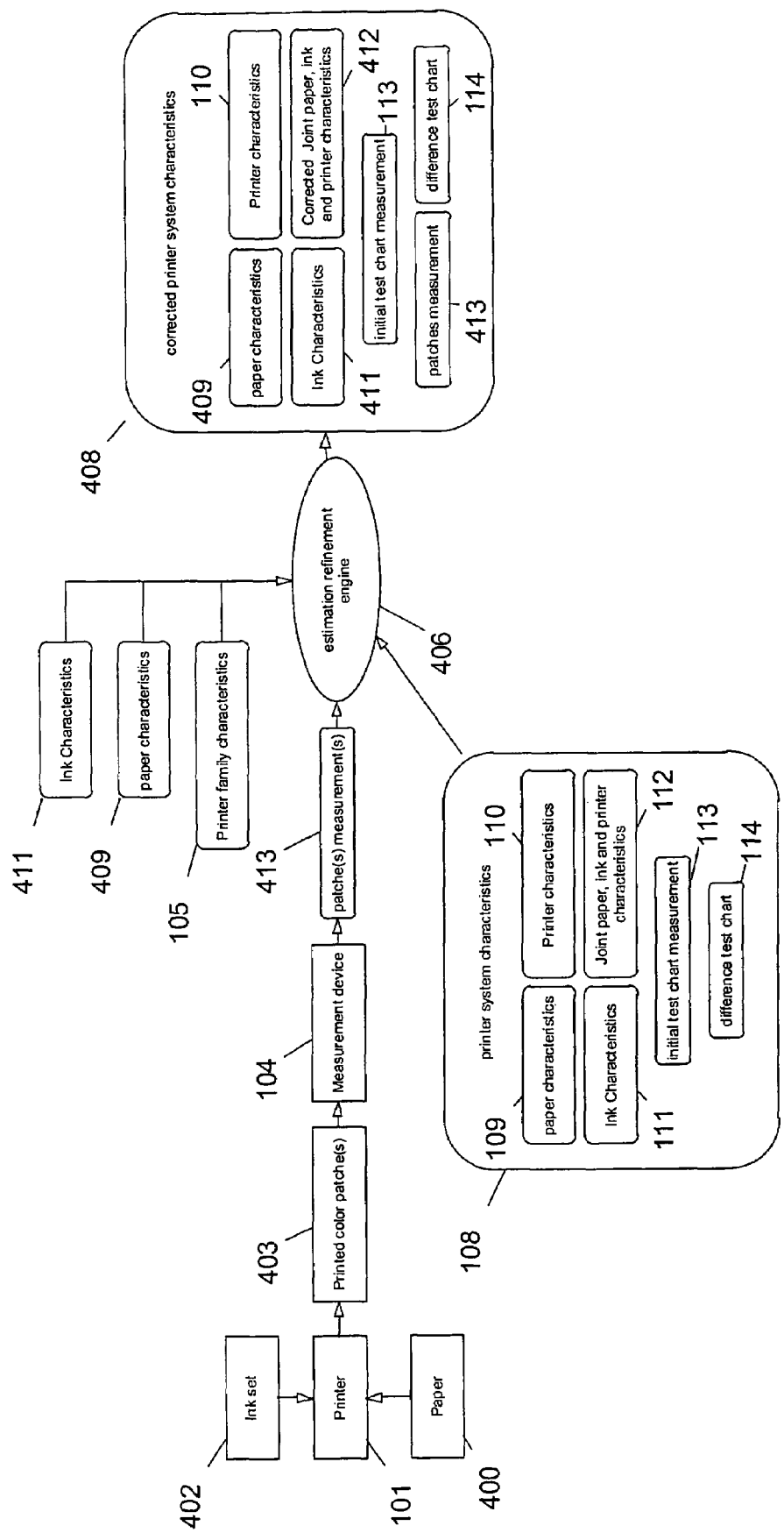
FIG. 4 shows an exemplary technique that allows improving the precision of the color management by printing one or several color patches with the printer.

FIG. 4 describes a technique that allows improving the precision of the color management by printing one or several color patches with the printer. An ink set 402 and a paper 400 are fed into the printer 101 that prints the color patch(es) 403. The ink set 402 may differ, but is not required to differ, from the ink set 102. The paper 400 may differ, but is not required to differ, from the paper 100. The color patch(es) 403 are measured with the measurement device 104 resulting in the patch(es) measurement(s) 413. The estimation refinement engine 406 uses the printer system characteristics 108, the printer family characteristics 105 and the patch(es) measurement(s) 413 to compute a corrected printer system characteristics 408.

If the ink set 402 differs from the ink set 102, the estimation refinement engine 406 also uses the characteristics of the changed inks 411. If the ink set 402 is the same than the ink set 102, the system keeps the ink set characteristics 111 (i.e. the ink set characteristics 411 is equal to the ink set characteristics 111) unless the estimation refinement engine 406 determines, based on the information coming from the patch(es) measurement(s) 413, that the ink set characteristics 111 have changed over time and performs an appropriate correction which will result in a new ink set characteristics 411.

If the paper 400 differs from the paper 100, the estimation refinement engine 406 also uses the characteristics of the new paper 409. If the paper 400 is the same than the paper 100, the system keeps the paper characteristics 109 (i.e. the paper characteristics 409 are equal to the paper characteristics 109) unless the estimation refinement engine 406 determines, based on the information coming from the patch(es) measurement(s) 413, that the paper characteristics 109 have changed over time and performs an appropriate correction which will result in a new paper characteristics 409.

The corrected printer system characteristics 408 contains the paper characteristics 409, the printer characteristics 110, the ink characteristics 411 the corrected joint paper, ink and printer characteristics 412, the initial test chart measurement 113, the difference test chart 114 and the patches measurement 413.

An exemplary purpose of the processing in FIG. 4 is the update of the joint paper, ink and printer characteristics 112 with the corrected joint paper, ink and printer characteristics 412.

Figure 5:
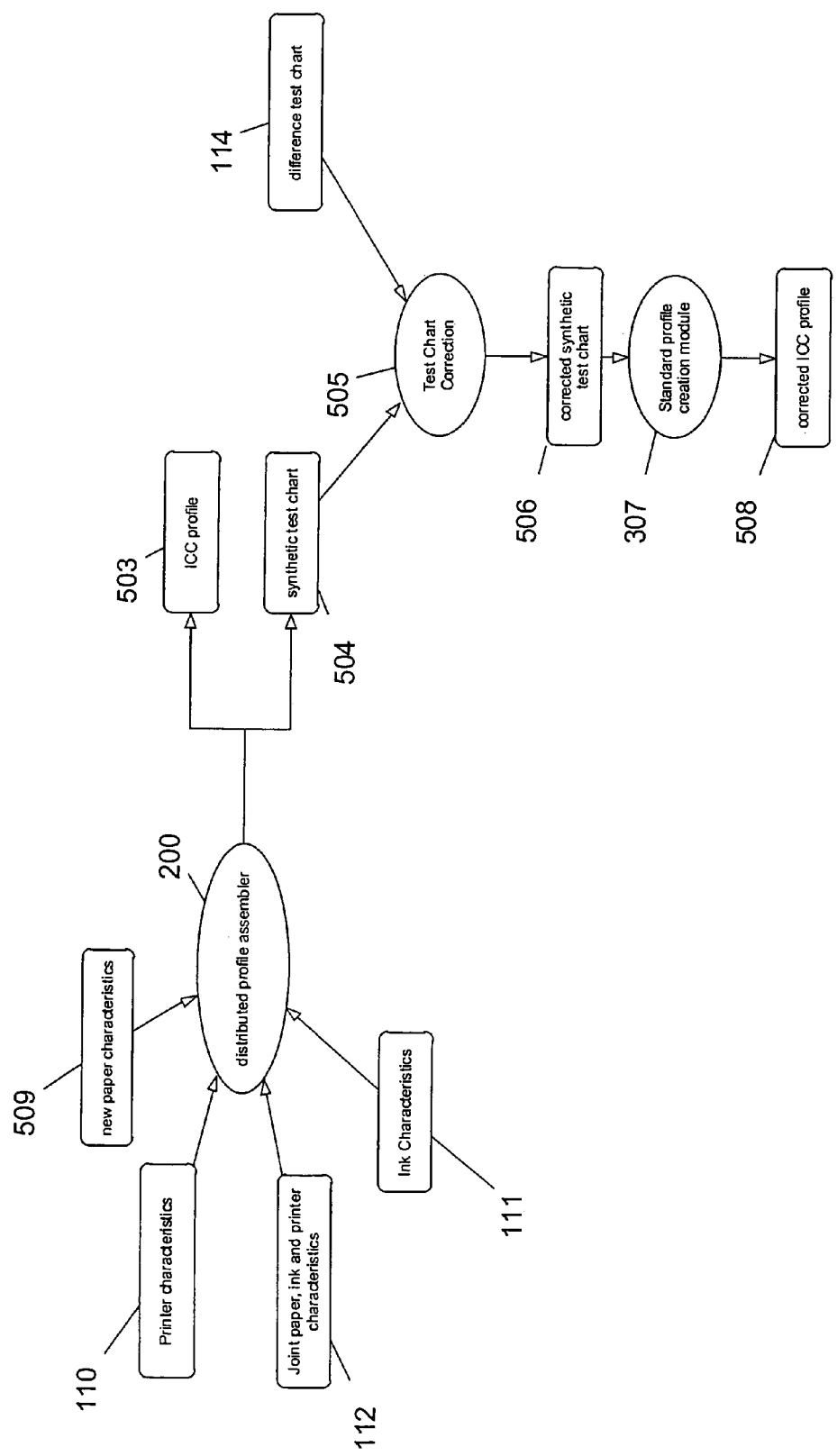
FIG. 5 depicts an exemplary method of enabling a paper change in the color management framework of this invention.

FIG. 5 depicts a method enabling a paper change in the color management framework of this invention: the distributed profile assembler 200 combines the new paper characteristics 509 with the printer characteristics 110, the ink characteristics 111 and the joint paper, ink and printer characteristics 112 to build the ICC profile 503. It also re-computes the color patches of the test chart 103 resulting in the synthetic test chart 504. The system assumes that the joint paper ink and printer characteristics 112 have not changed. The synthetic test chart 504 can be corrected by the test chart correction module 505 with the difference test chart 114: the patches of synthetic test chart 504 get corrected by addition of the corresponding patch in the difference test chart 114. The test chart correction module 505 outputs a corrected synthetic test chart 506. A standard profile creation module 307 uses the corrected synthetic test chart 506 to create a corrected ICC profile 508.

The user can choose either to use the profile 503 or the profile 508.

Figure 6:
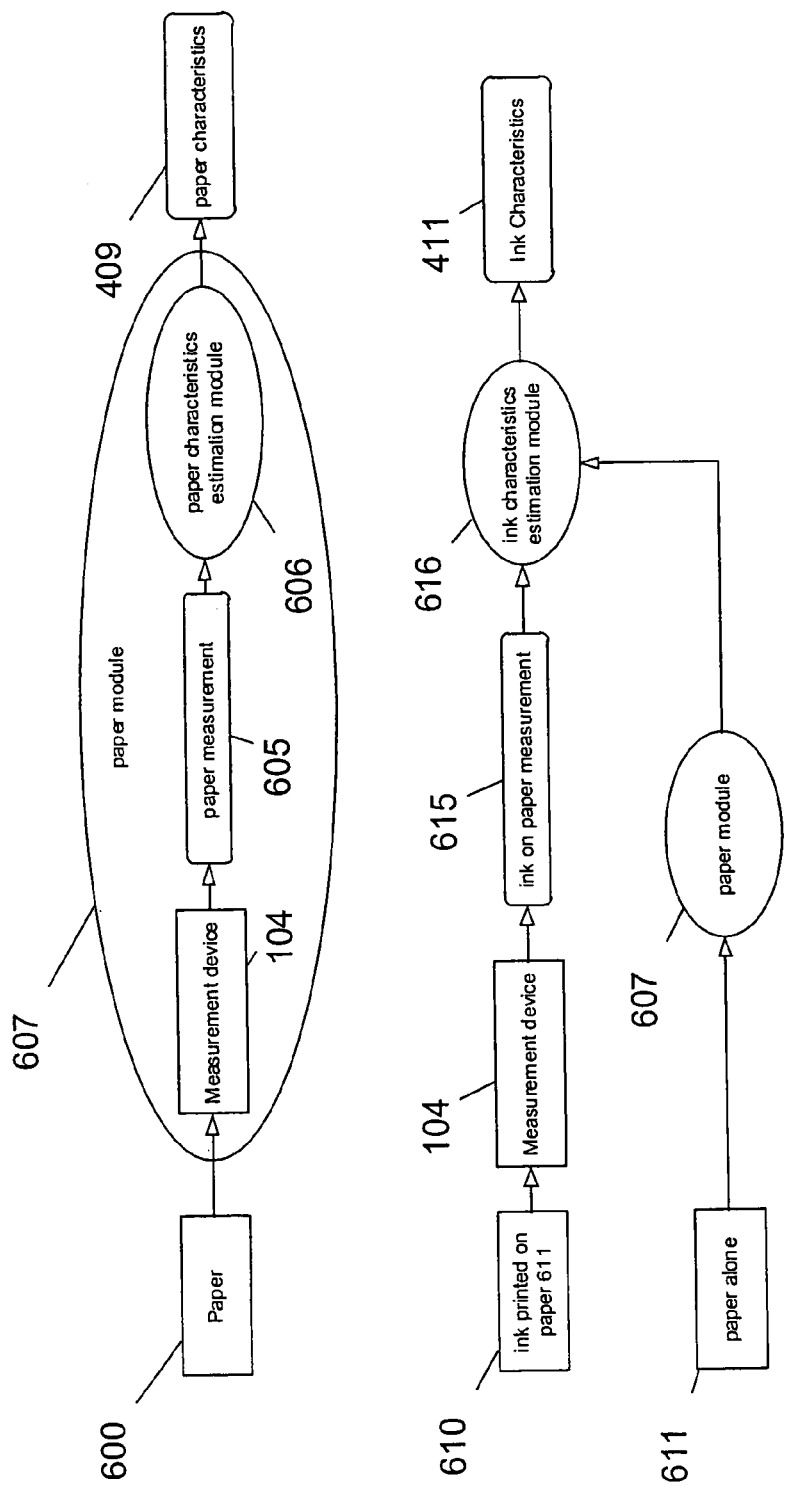
FIG. 6 shows an example of how the paper and ink characteristics can be computed from a sample of paper and printed ink.
Figure 7:
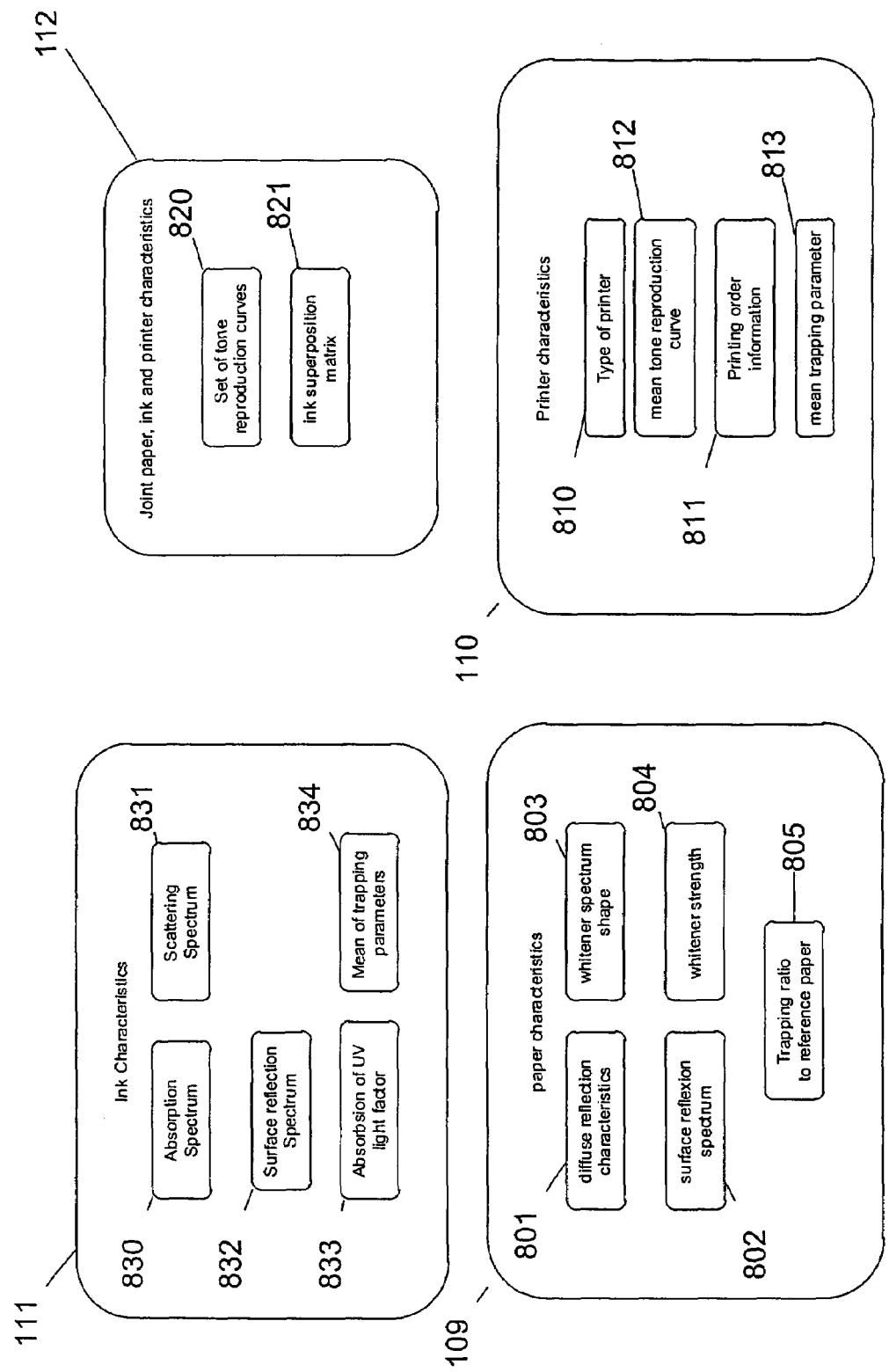

FIG. 6 describes how to compute the paper and ink characteristics from a sample of paper and printed ink. The paper 600 is measured by the measurements device 104. The paper measurement 605 is input in the paper characteristics estimation module 606 that outputs the new paper characteristics 409. The concatenation of the measurement device 104, the paper measurement 605 and the paper characteristics estimation module 606 is denoted as the paper module 607.

To characterize the ink, the ink 610 is printed on paper 611 and measured with the measurement device 104 that outputs the ink on paper measurement 615. The paper 611 alone—with no ink on it—is characterized by the paper module 607. Using the paper module 607 output and the ink on paper measurement 615, the ink characteristics estimation module 616 computes the ink characteristics 411.

Figure 13:
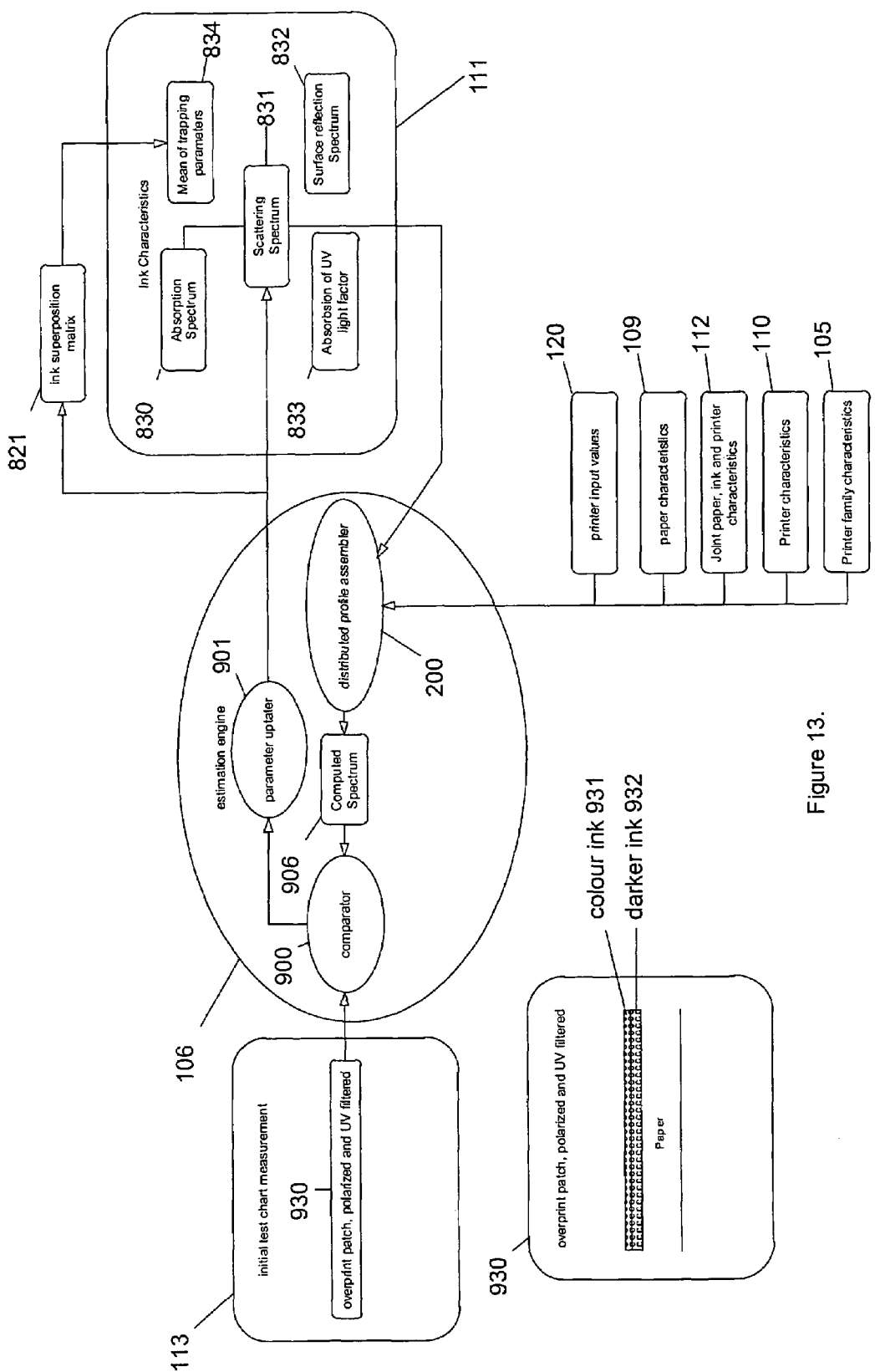

The following details an internal functioning of the distributed profile assembler 200. Let ink 001 be the first ink printed on the paper and ink 002 be the ink printed after ink 001. In other words, ink 002 can lie either on ink 001, or on the paper at the location where no ink 001 has been deposited, as depicted in FIG. 13. The order in which the inks are deposited on paper are detailed in the printing order information 811.

The distributed profile assembler 200 simulates the ink deposition on paper to compute, for each input to the printer, the reflection spectrum as well as a CIELAB value. The ink deposition refers to an ink coverage percentage, and to an ink thickness or concentration.

Given an input value, the distributed profile assembler 200 simulates ink deposition on paper in the order that corresponds to the printing order. The deposition of ink 001 is computed using the tone reproduction curve of ink 001, contained in the Set of tone reproduction curves 820. If the tone reproduction curve of ink 001 cannot be found in 820, then the distributed profile assembler 200 uses the mean tone reproduction curve 812. The ink deposition is further corrected using the trapping ratio to reference paper 805.

For each subsequent ink, the ink deposition is computed using a statistical model. The statistical model enumerates each possible overlapping case, and determines its importance—or weight—for the final calculation. For example, in a two inks printer as shown in FIG. 16, the distributed profile assembler 200 computes the ink 001 deposition on paper (case 1), the ink 002 deposition on paper (case 2), as well as the ink 002 deposition on top of ink 001 (case 3). Then, it computes the spectra associated with ink 001 on paper, ink 002 on paper, ink 002 on ink 001, and adds the results in an add-hoc manner, by using the probabilities of the events: ink 001 on paper (case 1), ink 002 on paper (case 2), ink 002 on ink 001 (case 3), and no ink at all (case 0), respectively.

When printing ink X on top of another ink Y, the ink deposition X is computed using the tone reproduction curve of ink X stored in the set of tone reproduction curves 820, and the trapping parameter of the ink couple X/Y, stored in the ink superposition matrix 821. If the tone reproduction curve of ink X is not available in the set of tone reproduction curves 820, the distributed profile assembler 200 uses the mean tone reproduction curve 812. If the trapping parameter of the ink couple X/Y is not available, the distributed profile assembler uses the mean trapping parameter 834 of ink Y. If the mean trapping parameter 834 of ink Y is not available, the distributed profile assembler 200 uses the mean trapping parameter 813.

The distributed profile assembler 200 can use the trapping parameter in two ways, depending on the type of printer 810. For gravure or offset printer types, the trapping parameter refers to the ratio of the ink thickness when printed on ink with respect to the ink thickness when printed on the reference paper 100. For ink jet printer type the trapping parameter refers to a joint thickness ratio and area ratio of ink with respect to the ink printed on paper 100.

The estimation engine 106 is composed of the distributed profile assembler 200, the comparator 900 and the parameter updater 901. From a given state of the ink characteristics 111, the paper characteristics 109, the printer characteristics 110, the joint paper, ink and printer characteristics 112 and the printer family characteristics 105, the distributed profile assembler 200 computes a spectrum 902 given an printer input value 120. The comparator 900 compares the spectrum 902 with the corresponding measured spectrum found in the initial test chart measurement 113. The result of the comparison is put in the parameter updater 901 who corrects the appropriate characteristics in printer system characteristics 108. The workflow is repeated until the comparator 900 decides that the spectrum 902 matches the initial test chart measurement 113 patch. This recursive workflow is referred to as the update procedure 999 in the text.

Figure 8:
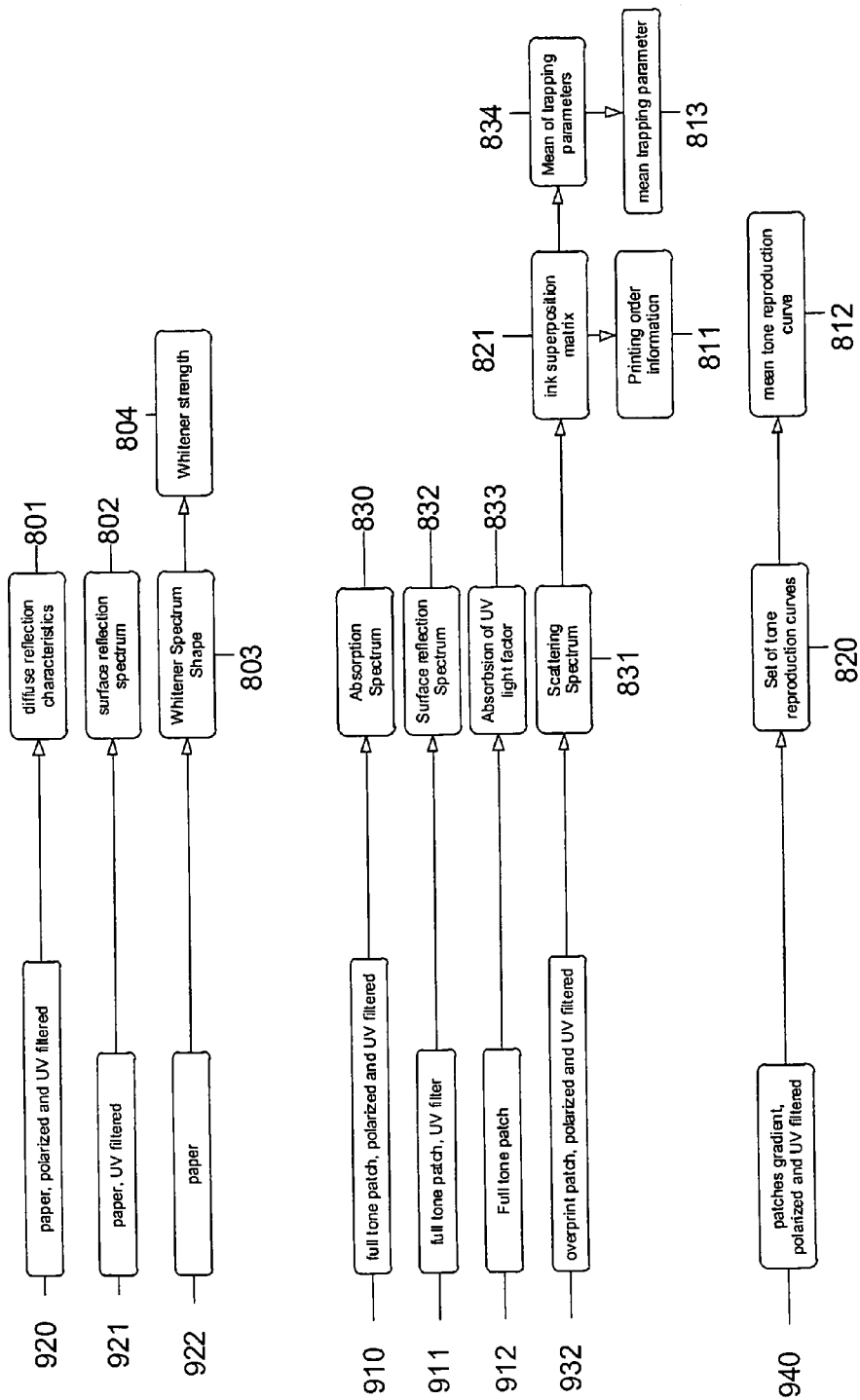

The association of the characteristics with the patches in the initial test chart measurement 113 is overviewed in FIG. 8, and detailed in FIGS. 9, 10, 11, 12, 13, 14 and 15. In FIG. 8, the elements are estimated in the order they appear on the figure, from top to bottom.

Figure 9:
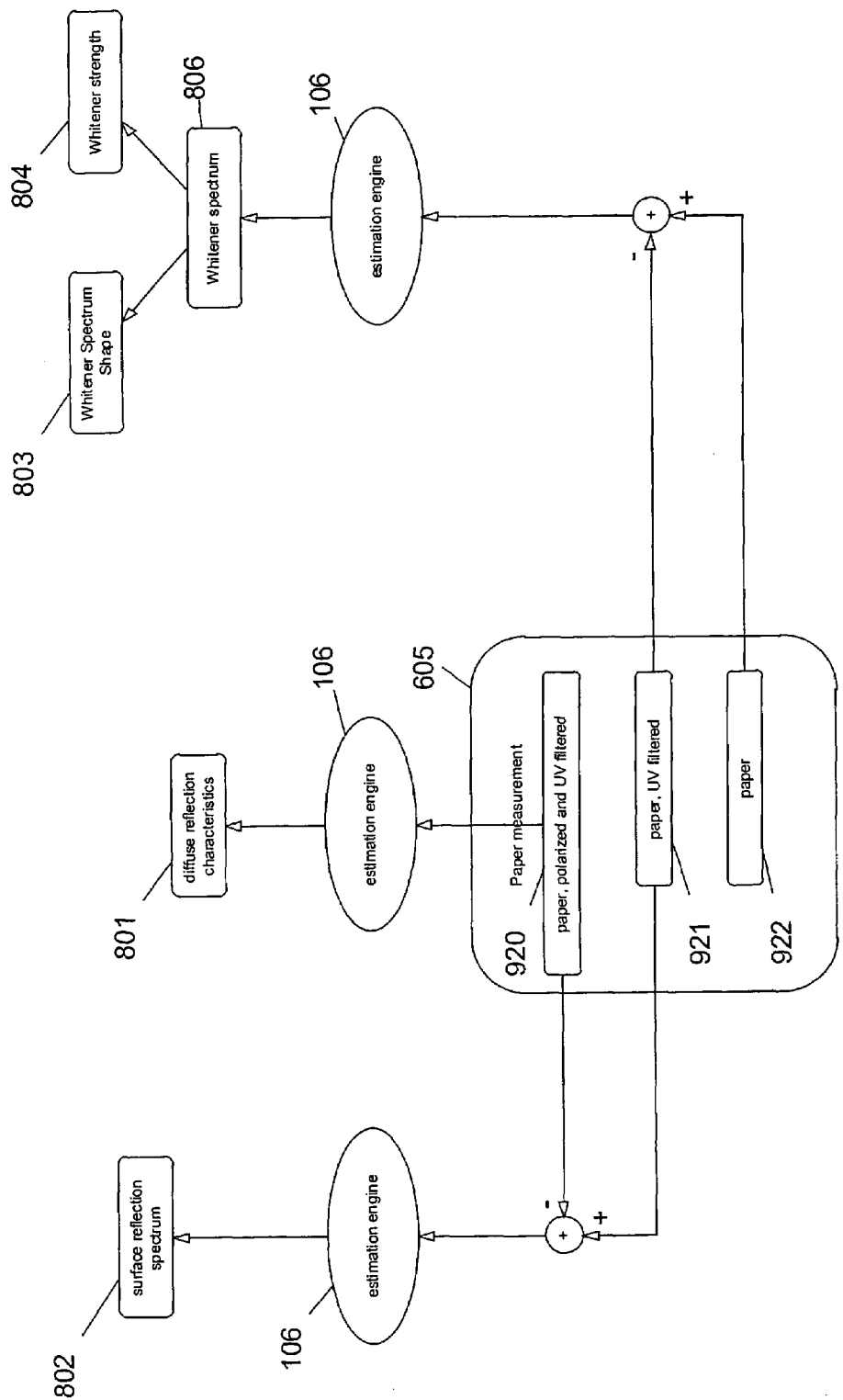

FIG. 9 depicts the estimation of the paper characteristics 409. The paper characteristics 109 and 409 are the same, but estimated in a different context. The estimation engine 106 uses the paper, polarized and UV filtered 920 spectrum to compute the diffuse reflection characteristics 801 of the paper. The estimation engine computes the surface reflection spectrum 802 of the paper, by using the difference between the paper, polarized and UV filtered 920 spectrum and the paper, UV filtered 921 spectrum. The estimation engine 106 computes the whitener spectrum 806 from the difference between the paper 922 spectrum and the paper, UV filtered 921 spectrum. The whitener spectrum 806 gets normalized and results in the Whitener spectrum shape 803. The overall amplitude of the whitener spectrum 806 is stored in the whitener strength 804.

If the paper, UV filtered 921 spectrum is unavailable, the estimation engine 106 sets the value of the whitener spectrum 806 to a value known a-priori; the whitener strength 804 is determined using a smoothness criterion applied on the spectrum of the paper 922, in the region of the spectrum where the whitener has its maximum. Any overshoot in that region of the spectrum is supposed to be caused by the whitener spectrum.

If the polarized and UV filtered 920 spectrum is unavailable, it is set to a constant value, also known a priori.

Figure 10:
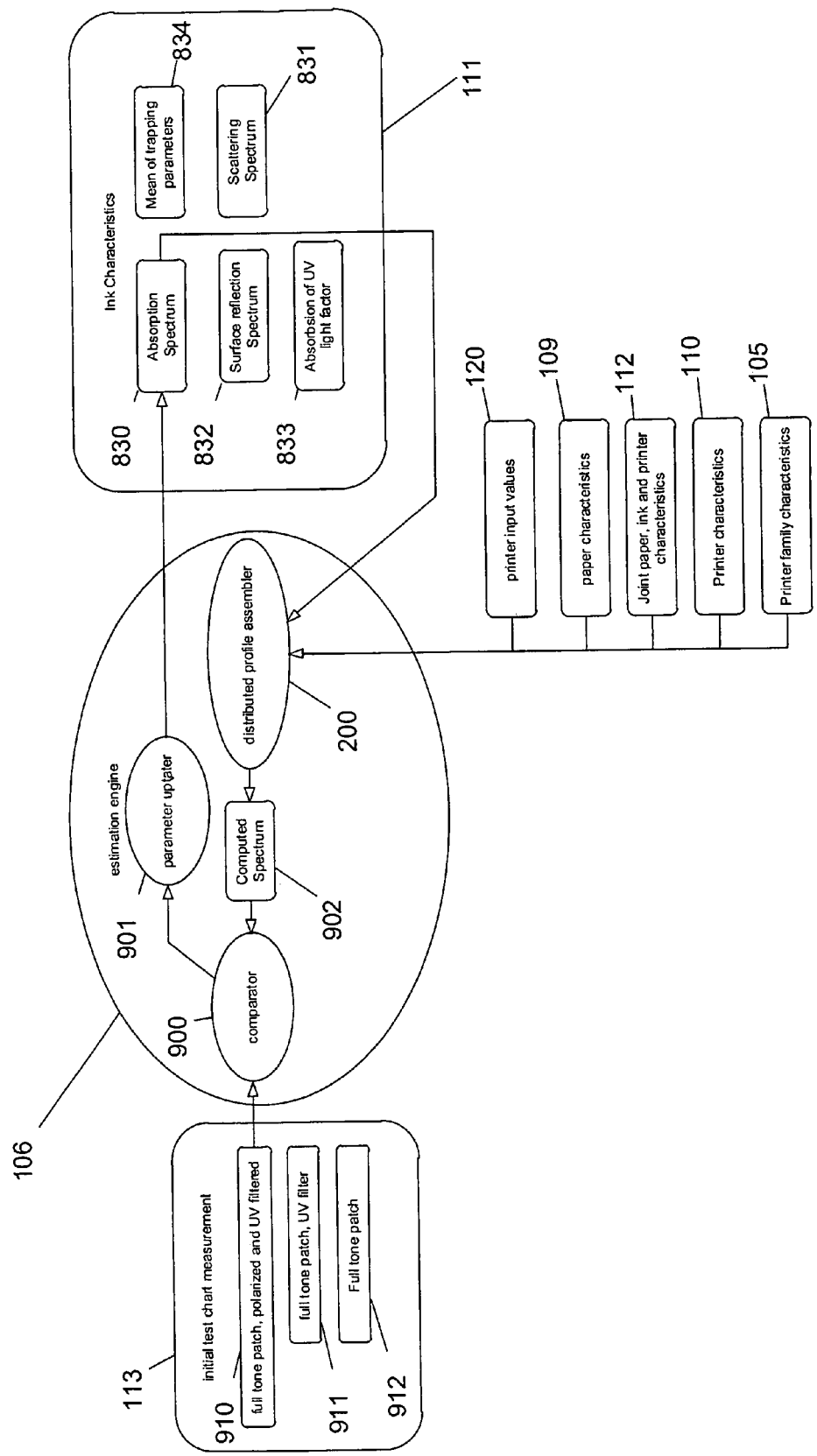

FIG. 10 depicts the estimation of the absorption spectrum 830 of an ink. The absorption spectrum 830 is first set to an initial value that is of no importance for this invention. The full tone patch, polarized and UV filtered 910 is extracted from the initial test chart measurement 113. By disregarding the scattering spectrum 831, the absorption of UV light factor 833, the surface reflection spectrum 832 and the mean of trapping parameter 834, the distributed profile assembler 200 computes the spectrum 902. The comparator 900 compares the spectrum 902 with the full tone patch, polarized and UV filtered 910 and launches the update procedure to find the best values of the absorption spectrum 830.

Figure 11:
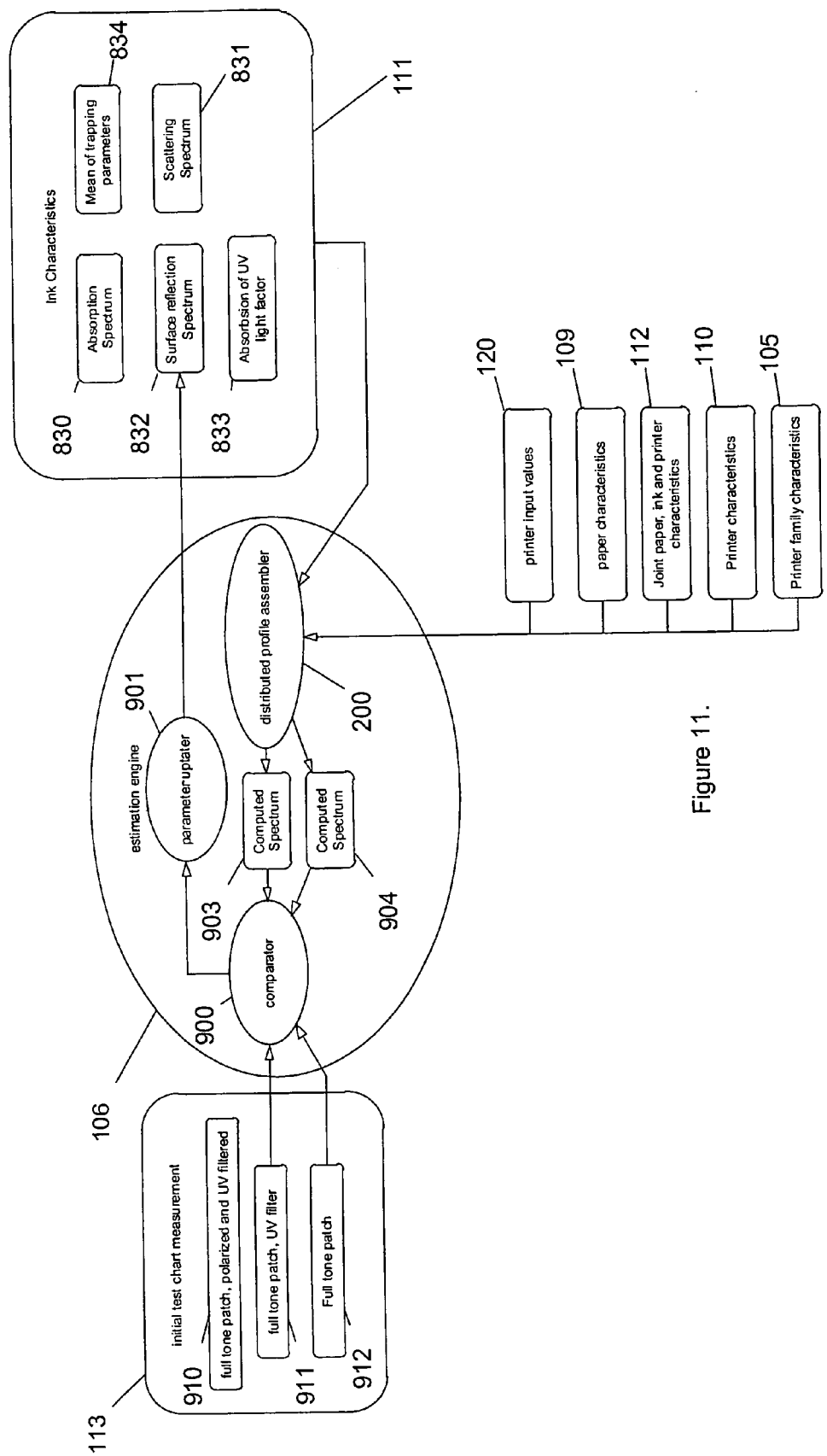

FIG. 11 depicts the estimation of the surface reflection spectrum 832. The surface reflection spectrum 832 is first set to an initial value that is of no great importance for this invention. The full tone patch, polarized and UV filtered 910 and the full tone patch, UV filtered 911 are input to the comparator 900. By disregarding the scattering spectrum 831, the absorption of UV light factor 833 and the mean of trapping parameter 834, the distributed profile assembler 200 computes the spectrum 902 and spectrum 903. The spectrum 902 is computed from the absorption spectrum 830 and the spectrum 903 computed from the combination of the absorption spectrum 830 and the surface reflection spectrum 832. The comparator 900 compares the difference between spectrum 902 and spectrum 903 and compares it to the difference between spectrum 910 and spectrum 911. Then, the comparator 900 launches the update procedure to find the best values of the surface reflection spectrum 832.

The paper characteristics estimation module 606 works like the estimation module 106 in FIG. 11. The estimation module 106 as well as the paper characteristics estimation module 606 set the trapping ratio to reference paper 805 equal to 1.

Figure 12:
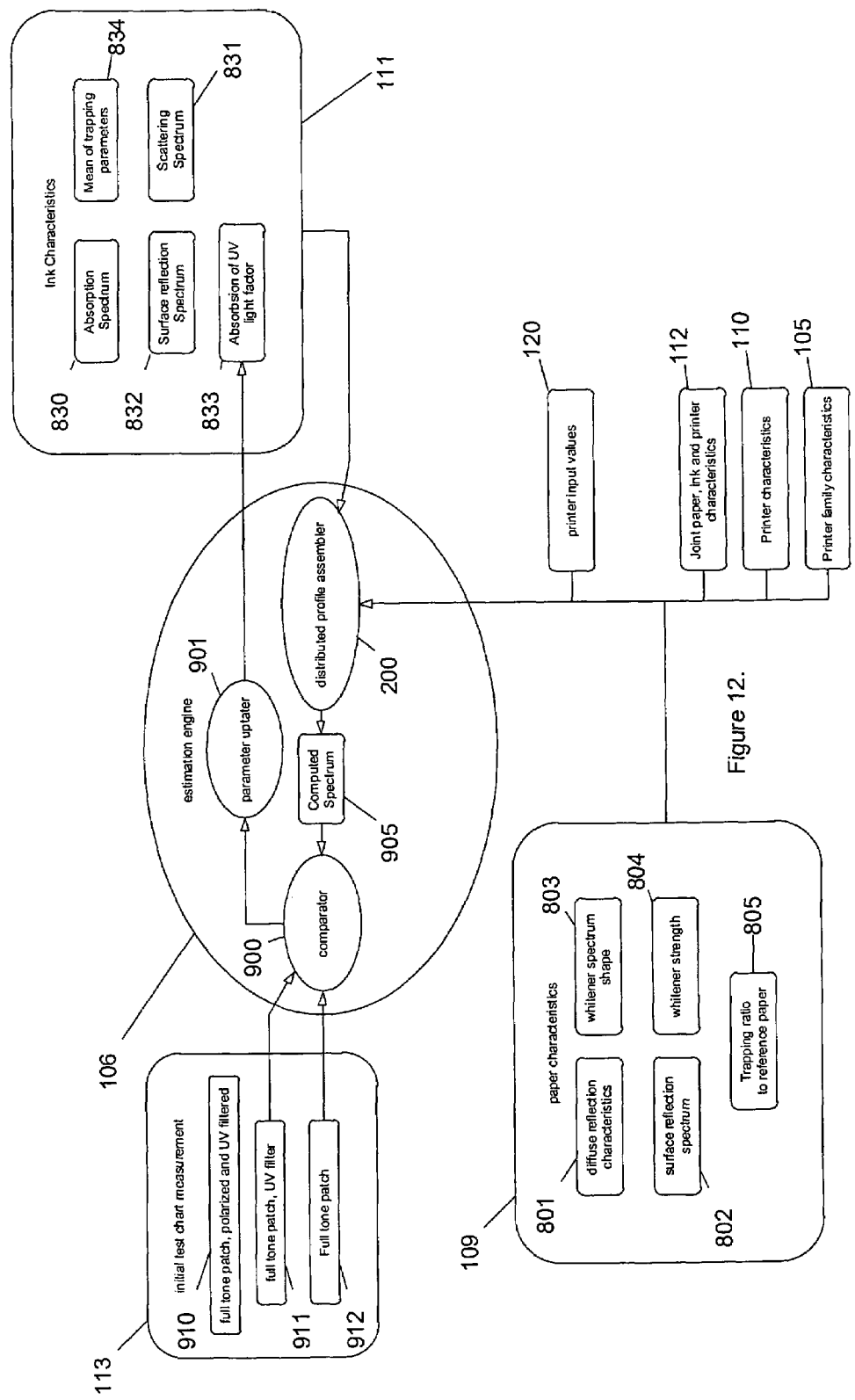

FIG. 12 depicts the estimation of the absorption of the UV light factor 833. The absorption of the UV light factor 833 is first set equal to 0. The full tone patch, UV filtered 911 is subtracted from the full tone patch 912 to result in the whitener contribution spectrum 913. The distributed profile assembler 200 uses the whitener spectrum shape 802 and strength 804 and the absorption of the UV light factor 833, and assumes that it embodies the energy of light that illuminates the ink from the bottom. The distributed whitener profile assembler 200 outputs the associated computed whitener spectrum 905. The comparator 900 compares the difference between the computed whitener spectrum 905 and whitener contribution spectrum 913. Then, the comparator 900 launches the update procedure 999 to find the best value of the absorption of the UV light factor 833.

FIG. 13 depicts the estimation of the scattering spectrum 831, and the trapping parameter that will be stored in the ink superposition matrix 821. The scattering spectrum is first set to 0. The scattering spectrum of the first ink, ink 001, is assumed to be 0. The scattering spectrum 831 is computed from the overprint patch 930 of the color ink 931 on a darker color 932. By darker color we refer to an ink who absorbs light in the region where the given ink scatters, or is transparent to the light. If available, black ink is used. Among the ink characteristics 111, the distributed profile assembler uses the absorption spectrum and the scattering spectrum of the color ink 931 and the darker ink 932 to compute the spectrum 906 of the overprint patch. The comparator 900 compares the spectrum 906 with the overprint patch, polarized and UV filtered spectrum 930 and launches the update procedure 999 to find the best values of the scattering spectrum 831 and the trapping parameter in the ink superposition matrix 821. Once every combination of ink overprint has been computed, the mean of trapping parameters 834 as well as the mean trapping parameter 813 are computed from the ink superposition matrix 821.

Figure 14:
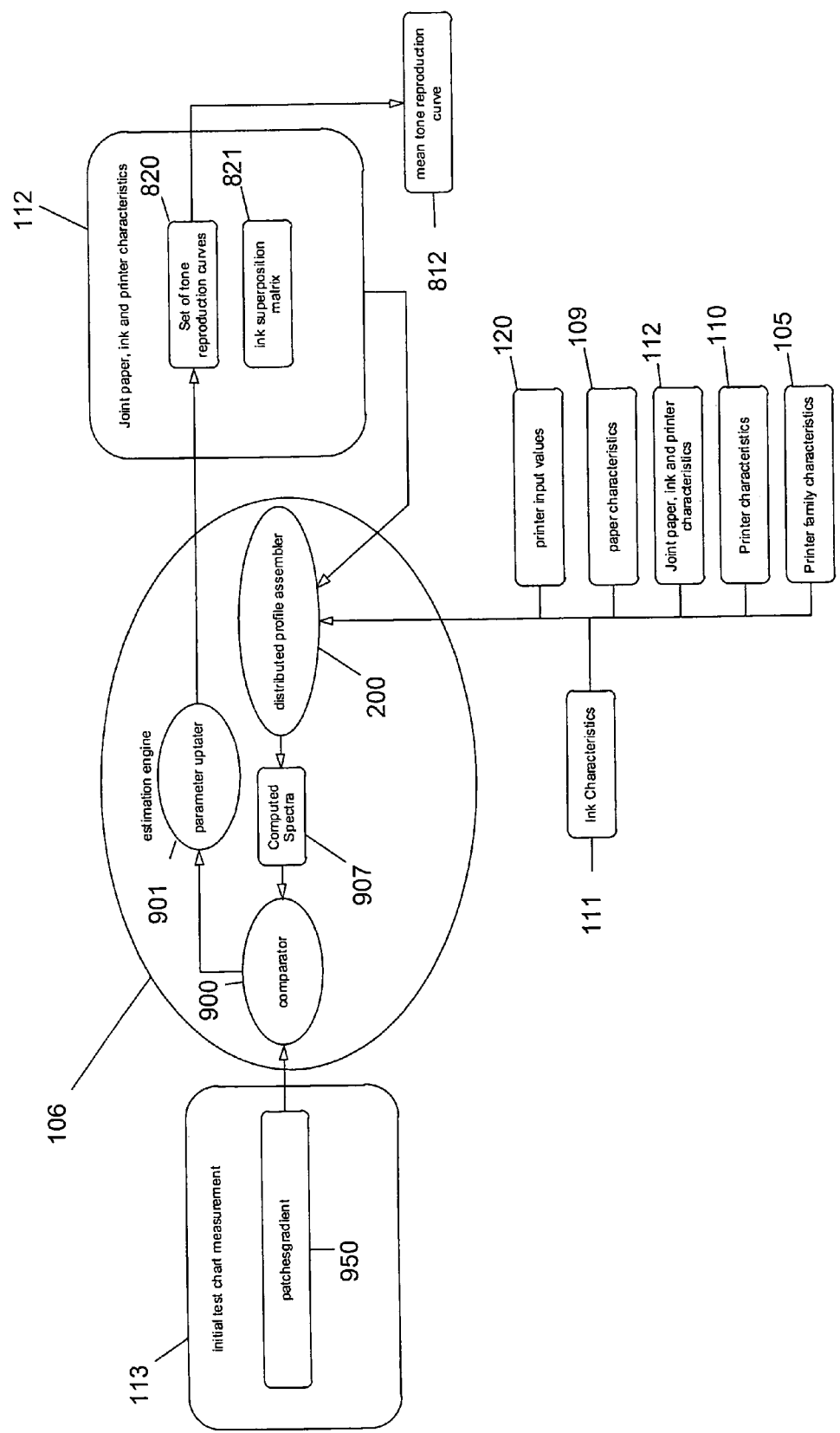

FIG. 14 depicts the estimation of the set of tone reproduction curves 820. The tone reproduction curve 820 relate the printer input values 120 to the area coverage an ink thickness. The initial test chart measurement 113 contains the gradient of patches 950, i.e. a set of patches with increasing area coverage. The set of tone reproduction curves 820 are set to an initial value irrelevant for this invention. From the printer input values 120, and printer system characteristics 108, the profile assembler engine 200 outputs a set of computed spectra 906. The comparator 900 compares the difference between the set of computed spectra 906 and the gradient of patches 950. Then, the comparator 900 launches the update procedure to find the best values of the set of tone reproduction curves 820. The parameter updater 901 makes sure that the computed area coverage and ink thickness vary smoothly according to the input values 120. Finally, the set of reproduction curves 820 is averaged and stored into the mean tone reproduction curve 812.

The ink characteristics estimation module 616 estimates the ink characteristics 411 in the same way than the estimation engine 106 estimates the ink characteristics 111 in FIGS. 10, 11, 12 and 13.

The estimation refinement engine 406 is composed of the same elements as the estimation engine 106. Its purpose is, when a print is available, to replace the characteristics elements computed in the context of FIG. 6 with the elements computed as described in FIGS. 10, 11, 12, 13 and 14.

Figure 15:
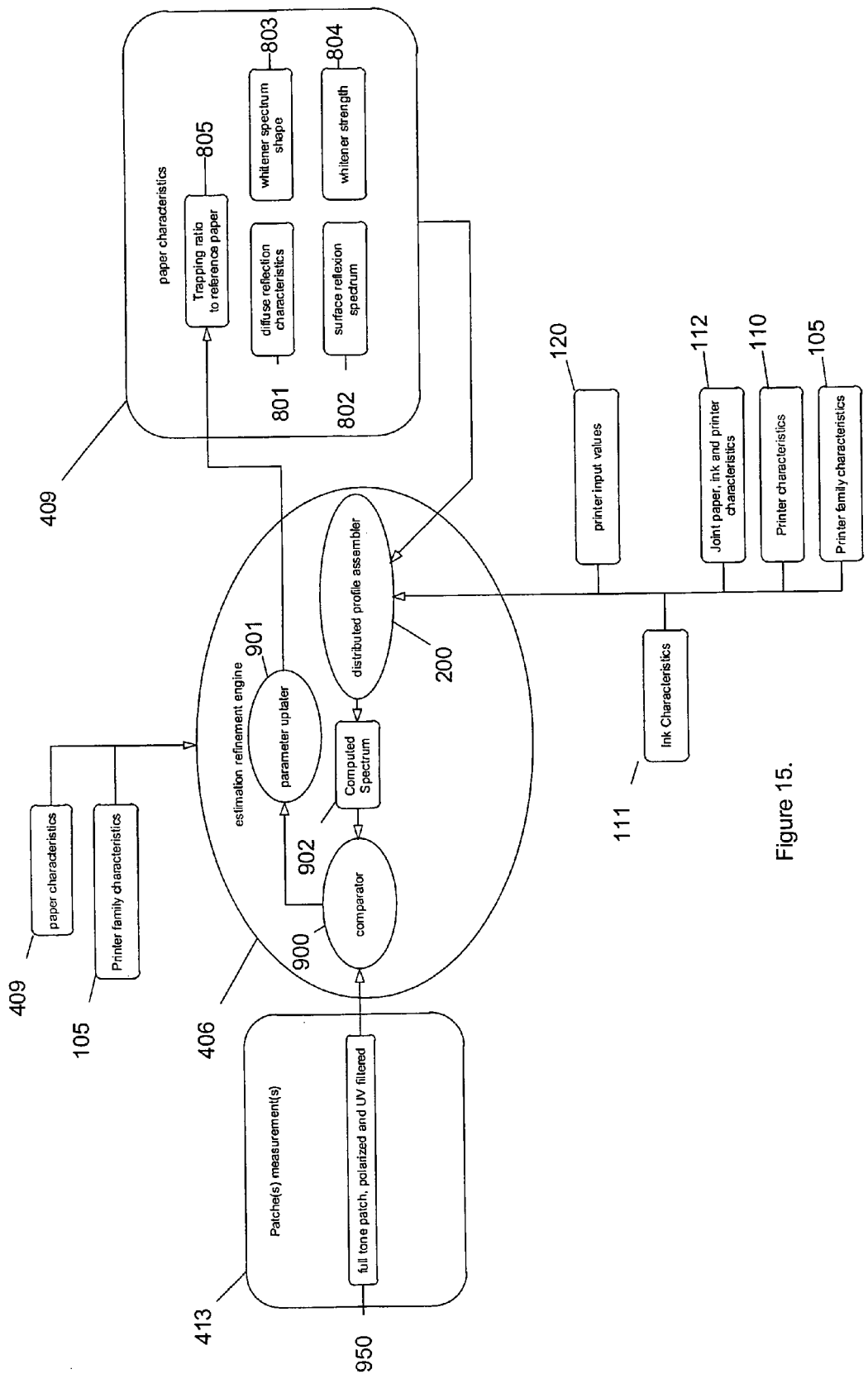

FIG. 15 illustrates how a print of a single patch of color on a new paper can improve the system color description. The estimation refinement engine 406 uses a full tone patch, polarized and UV filtered 950 of an old ink—whose characteristics are contained in the ink characteristics 111—on the new paper. The estimation refinement engine 406 is used to estimate variations of ink deposition between the ink on the old paper 100 and on the new paper 400. This variation is embodied by a trapping parameter, computed using the processing of FIG. 13, and assuming the ink is printed on a full transparent and non scattering ink; the resulting trapping parameter is stored in the trapping ratio to reference paper 805 parameter.

When printed patch(es) of a new ink are available, the estimation refinement engine 406 can recompute the ink characteristics using the method described in FIGS. 10, 11, 12, 13 and 14.

The following is a description of an exemplary preferred embodiment of a mathematical model underlying the present invention.

The color management is enabled through the modeling and computation of the spectrum that a combination of inks reflect.

The reflectance spectrum R of ink printed on the paper is modeled by the following equation:

$$R(k_\lambda, l) = R_{sf} + \frac{(1-r_0)I_{I\lambda}R_{p\lambda}I_{A\lambda}}{\sin^2(\alpha_1)\cdot(1-R_{p\lambda}I_{S\lambda})} \quad (0.1)$$

where $R_{sf}$ is a surface reflection spectrum 832 which depends on the paper, the inks and the wavelength.

$R_{p\lambda}$ is the internal diffuse spectral characteristics 801 of the paper.

$r_0$ is the proportion of the light that gets reflected, thus not entering the paper.

$\sin^2(\alpha_1)$ is a normalization parameter that depends on the geometry of the measurement device used to characterize printed data.

For a single ink printed on paper with no whitener, the integrals $I_{A\lambda}$, $I_{S\lambda}$ and $I_{I\lambda}$ are defined as follow:

$$I_{A\lambda} = \int_{l=0}^{\infty}\int_{\theta=0}^{\alpha_2} P(l)\cdot(1-r_{21})e^{-k_\lambda l/\cos(\theta_2)}\sin(2\theta)d\theta dl,$$

$$I_{S\lambda} = \int_{l=0}^{\infty}\int_{\theta=0}^{\pi/2} P(l)\cdot r_{21}e^{-2k_\lambda l/\cos(\theta_2)}\sin(2\theta)d\theta dl,$$

$$I_{I\lambda} = \int_{l=0}^{\infty} P(l)\cdot e^{-k_\lambda l/\cos(\theta_2)}dl,$$

where $k_\lambda$ is the ink transmittance index (830), and depends only on the ink, l is the ink layer thickness expressed in arbitrary units, P(l) is the ink layer thickness probability density function, $\lambda$ is the wavelength, and $\theta_2$, $\alpha_2$ two angles given by the measurement device. $r_{21}$ is a fixed parameter given by the measurement instrument geometry.

For several inks, the integrals $I_{A\lambda}$, $I_{S\lambda}$ and $I_{D\lambda}$ are defined as follow:

$$I_{A\lambda} = \int_{l_1=0}^{\infty} \ldots \int_{l_n=0}^{\infty}\int_{\theta=0}^{\alpha_2} P(l_1, \ldots, l_n) \cdot$$

$$(1-r_{21})e^{-\frac{k_{\lambda,1}l_1+k_{\lambda,2}l_2+\ldots+k_{\lambda,n}l_n}{\cos(\theta_2)}} \sin(2\theta) d\theta dl_n \ldots dl_1,$$

$$I_{IUV} =$$

$$\int_{l_1=0}^{\infty} \ldots \int_{l_n=0}^{\infty} P(l_1, \ldots, l_n) \cdot e^{-\frac{k_{uv,1}l_1+k_{uv,2}l_2+\ldots+k_{uv,n}l_n}{\cos(\theta_2)}} dl_1 \ldots dl_n,$$

$$I_{S\lambda} = (1 + I_{IUV} \cdot W_\lambda) \cdot$$

$$\int_{l_0=0}^{\infty} \ldots \int_{l_n=0}^{\infty}\int_{\theta=0}^{\pi/2} P(l_1, \ldots, l_n) \cdot r_{21} e^{-2\frac{k_{\lambda,1}l_1+k_{\lambda,2}l_2+\ldots+k_{\lambda,n}l_n}{\cos(\theta_2)}}$$

$$\sin(2\theta) d\theta dl_n \ldots dl_1,$$

$$I_{D\lambda} = \int_{l_1=0}^{\infty} \ldots \int_{l_n=0}^{\infty} (1+W_\lambda) \cdot P(l_1, \ldots, l_n) \cdot$$

$$e^{-\frac{k_{\lambda,1}l_1+k_{\lambda,2}l_2+\ldots+k_{\lambda,n}l_n}{\cos(\theta_2)}} dl_n \ldots dl_1 + I_{IUV},$$

where n is the number of ink involved, and $l_1, \ldots, l_n$ the thickness of the first ink, second ink, . . . , and nth ink. $k_{\lambda,i}$ denotes the transmittance index of ink number i, at wavelength $\lambda$. $k_{uv,i}$ denotes the transmittance index of ink number i, to ultra-violet light (833). Each parameter that depends on $\lambda$ is a vector that has as many components as the measured spectrum. In the current implementation 36 components are used, representing wavelengths ranging from 380 nm (nanometers) to 730 nm in steps of 10 nm.

The ink characteristics are composed of

The transmittance indexes vector $k_\lambda$ (830)

The transmittance value $k_{uv}$ to ultra-violet light (833)

$R_{sf}$ the surface reflectance factor (832)

$\mu$ the mean trapping parameter (834), see below

The paper characteristics are composed of

The internal paper reflection parameter vector $R_{p\lambda}$ (801)

The paper whitener spectrum vector $W_\lambda$ (803 and 804)

A trapping correction factor $\mu$ (805)

The joint paper, printer and ink characteristics are composed of

The dependence of $P(l_1, \ldots, l_n)$ with the input command sent to the printer to generate the color patch, i.e. the tone reproduction curves (820).

The printer characteristics are composed of

A parameterization of the probability density function $P(l_1, \ldots, l_n)$ reducing the span of the possible functions for a particular printer family, affecting the tone reproduction curves (820).

$\mu$ a trapping parameter for each ink superposition combination (821)

For example, for an offset printer, the probability density function can be expressed as $$P(l_1, \ldots, l_n) = P_1(l_1) * P_2(\mu(l_1) \cdot l_2) * P_3(\mu(l_1+l_2) \cdot l_3) * \ldots$$

where $P_i(\cdot)$ is the probability density function of the thickness of ink number i. By convention, ink number i it the $i^{th}$ ink printed on the paper. The symbol * denotes the convolution operation.

$P_i(l)$ can be defined as $$P_i(l) = a_i \cdot \delta(l) + (1-a_i) \cdot e^{-\frac{l-1}{2\sigma_i}}$$

and the trapping parameter $\mu(l)$ is defined as $$\mu(l) = \begin{cases} \mu & \text{if } l > 0 \\ 1 & \text{else} \end{cases}$$

In this configuration, $\mu$ and $\alpha_i$ belong to the joint paper, printer and ink characteristics.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A color printing system, comprising:
    a color printer adapted to receive an image and text file and an international color consortium (ICC) profile associated with the color printer, printer inks and the printer paper, and adapted to print a color patch using chosen ink and chosen paper;
    a color measurement module adapted to generate a spectral measurement of at least one color output of the color printer; and
    a difference file containing a difference between a computed color patch and a measured color patch, wherein the printer contains information regarding:
    a set of ink files describing inks to be put in the color printer,
    a set of paper files describing papers to be fed into the color printer, and
    a set of spectral files which describe a spectral reflectance of a set of patches for a particular ink and paper combination;
    wherein the color printing system is adapted to create a corrected color consortium (ICC) profile for the color printer, when at least one of an ink and a paper is replaced in the color printer,
    wherein when an ink is replaced, an ink characteristics replacement module is adapted to modify the ink characteristics, by replacing the characteristics of the removed ink with the characteristics of the new ink, and
    wherein when a paper is replaced, a distributed profile assembler is adapted to combine the new paper characteristics with the printer characteristics, the ink characteristics and the joint paper, ink and paper characteristics.

2. The color printing system of claim 1, wherein the international color consortium (ICC) profile is computed for a combination of the ink sets and paper without printing an ink set on paper using the color printer.

3. The color printing system of claim 1, wherein the spectral characteristics of an ink combination, printed with the color printer on paper, is computed and stored in one of the spectral files.

4. The color printing system of claim 1, where precision of the international color consortium (ICC) profile is adjusted by printing at least one patch of a chosen ink, or ink set, on a chosen paper, and by measuring it with the color measurement module.

5. The color printing system of claim 1, where precision of the spectral files is adjusted by printing at least one patch of a chosen ink or ink set on a chosen paper and by measuring it with the color measurement module.

6. The color printing system of claim 1, where the paper files are computed from measurements taken by the color measurement module using the international color consortium profile and the spectral characteristics.

7. The color printing system of claim 1, where the ink files are computed from measurements taken by the color measurement module using the international color consortium profile and the spectral characteristics.

8. The color printing system of claim 1, where the difference file is computed from a color patch, as measured by the color measurement module and from spectral files.

9. The color printing system of claim 1, where the spectral files are adjusted using the difference file.

* * * * *